(12) United States Patent  
Speldrich

(10) Patent No.: US 7,603,898 B2  
(45) Date of Patent: Oct. 20, 2009

(54) MEMS STRUCTURE FOR FLOW SENSOR

(75) Inventor: Jamie W. Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/960,192

(22) Filed: Dec. 19, 2007

(65) Prior Publication Data

US 2009/0158838 A1 Jun. 25, 2009

(51) Int. Cl.
*G01F 15/00* (2006.01)
(52) U.S. Cl. .................. 73/204.26; 73/272 R
(58) Field of Classification Search ............ 73/204.11, 73/204.23, 204.25, 204.26
See application file for complete search history.

(56) References Cited

U.S. PATENT DOCUMENTS

| | | | |
|---|---|---|---|
| 4,478,077 A | 10/1984 | Bohrer et al. | |
| 4,548,078 A | 10/1985 | Bohrer et al. | |
| 4,651,564 A | 3/1987 | Johnson et al. | |
| 4,696,188 A * | 9/1987 | Higashi | 73/204.19 |
| 4,784,721 A | 11/1988 | Holmen et al. | |
| 5,311,775 A * | 5/1994 | Suski et al. | 73/204.26 |
| 5,656,773 A * | 8/1997 | Neda | 73/204.26 |
| 5,705,745 A | 1/1998 | Treutler et al. | |
| 6,526,823 B2 * | 3/2003 | Tai et al. | 73/204.26 |
| 6,647,778 B2 * | 11/2003 | Sparks | 73/204.26 |
| 6,794,981 B2 | 9/2004 | Padmanabhan et al. | |
| 6,871,538 B2 * | 3/2005 | Fujiwara et al. | 73/204.26 |
| 6,945,106 B2 * | 9/2005 | Lotters | 73/204.26 |
| 6,981,410 B2 * | 1/2006 | Seki et al. | 73/204.26 |
| 7,036,369 B2 * | 5/2006 | Keppner et al. | 73/204.26 |
| 7,069,779 B2 * | 7/2006 | Zumkehr et al. | 73/204.26 |
| 7,181,963 B2 * | 2/2007 | Bork | 73/204.26 |
| 7,258,003 B2 * | 8/2007 | Padmanabhan et al. | 73/204.26 |
| 7,263,882 B2 * | 9/2007 | Sparks et al. | 73/204.26 |
| 7,278,309 B2 | 10/2007 | Dmytriw et al. | |
| 7,331,224 B2 * | 2/2008 | Padmanabhan et al. | 73/204.26 |
| 7,360,416 B2 * | 4/2008 | Manaka et al. | 73/204.26 |
| 2005/0081621 A1 * | 4/2005 | Zobel et al. | 73/204.26 |
| 2007/0204688 A1 | 9/2007 | Dmytriw et al. | |
| 2007/0209433 A1 | 9/2007 | Gehman et al. | |
| 2007/0251292 A1 | 11/2007 | Beck et al. | |
| 2007/0295082 A1 * | 12/2007 | Kilian | 73/204.26 |

FOREIGN PATENT DOCUMENTS

JP 2002-340646 A 11/2002

* cited by examiner

*Primary Examiner*—Lisa M Caputo
*Assistant Examiner*—Freddie Kirkland, III
(74) *Attorney, Agent, or Firm*—Crompton, Seager & Tufte, LLC

(57) ABSTRACT

A MEMS based flow sensor is disclosed which generally incorporate isolation between a sensing structure and the sensed media. An internal flow channel can be configured by attaching a backing structure with flow openings to the back of the sensing structure. The sensing structure can be composed of a insulating layer with heating element and a dual sensing element which comprises of resistive thin films positioned in a Wheatstone bridge configuration over a backside cavity. The dual sensing element and its associated wirebonds can be isolated from the sensing media by directing the fluid through the internal flow channel. The completed sensing structure can be over packaged with standard processes such as epoxies and seals.

20 Claims, 4 Drawing Sheets

MEMS STRUCTURE FOR FLOW SENSOR

TECHNICAL FIELD

Embodiments are generally related to sensor methods and systems. Embodiments are also related to microelectromechanical systems (MEMS) and, more particularly, to MEMS structures. Embodiments are also related to flow sensors for measuring the mass flow of air or other fluid.

BACKGROUND OF THE INVENTION

Microelectromechanical systems (MEMS) include mechanical and electrical components having dimensions in the order of microns or smaller. MEMS structures are used in numerous applications including microsensors and microactuators. Microsensors can be used to sense and/or measure pressure, flow, acceleration, temperature and stress, amongst other conditions. A microsensor functions by generating electrical signals in response to an input condition such as flow, pressure or temperature on the sensor. The sensor may be calibrated such that the electrical signal and, thus the movement of the mechanical component, can be correlated to the condition.

The ability to detect the presence of air flow can be a key element of many systems and devices. MEMS based flow sensors can be utilized for measuring flow rates in a variety of commercial, industrial and medical applications. Various medical, process, and industrial applications, ranging from portable ventilators supplying pressurized air or respiratory treatments to large-scale processing plants in a chemical plant require the use of flow sensors. In such applications, flow control is an inherent aspect of proper operation, which can be achieved in part by utilizing flow sensors to measure the flow rate of fluid within a flow system. The flow sensor is typically deployed by placing it directly in the flow stream, which makes the flow sensor wire bonds, or sensing elements damaged by debris, lint, or from patient mishandling.

The problem with prior art flow sensor arrangements and relationships is that the wire bond pads and active regions of the sense die end up facing the sensed media. Water or other contaminants can attack the sense die and its wire bonds. Additionally, conventional flow sensor configurations lack the ability to sense ultra-low flow liquid.

Based on the foregoing it is believed that a need exists for an improved MEMS based flow sensor for protecting the sense die and its wirebonds from the flow stream, by attaching the flow channel structure to the backside of the sense die. It is believed that by utilizing the flow sensor described in greater detail herein, ultra-low flow liquid can potentially be sensed.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems.

It is another aspect of the present invention to provide for improved MEMS structure for flow sensors.

The aforementioned aspects and other objectives and advantages can now be achieved as described herein. A MEMS-based flow sensor is disclosed which generally incorporate isolation between a sensing structure and the sensed media. An internal flow channel can be configured by attaching a backing structure with an airflow opening to the back of the sensing structure. The sensing structure is composed of a heating element and a dual sensing element which comprises of resistive thin films positioned in a Wheatstone bridge configuration. The dual sensing elements and its associated wirebond pads can be isolated from the sensing media by directing the liquid through the internal flow channel. The completed sensing structure can be over packaged with standard processes such as epoxies and seals.

The wire bond pads can be used for electrical connection of the resistive thin films and the dual sensing element through electrical conductive leads extending on the backing structure. The backing structure can be placed on a planar surface. The backing structure can be etched silicon, machined or molded glass or molded plastic. The fluid can be passed through the flow channel hence wire bond pads are isolated from the flow channel in order to sense ultra-low flow fluid. The dual sensing element can be assembled utilizing standard wirebond pads and wirebonding methods.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
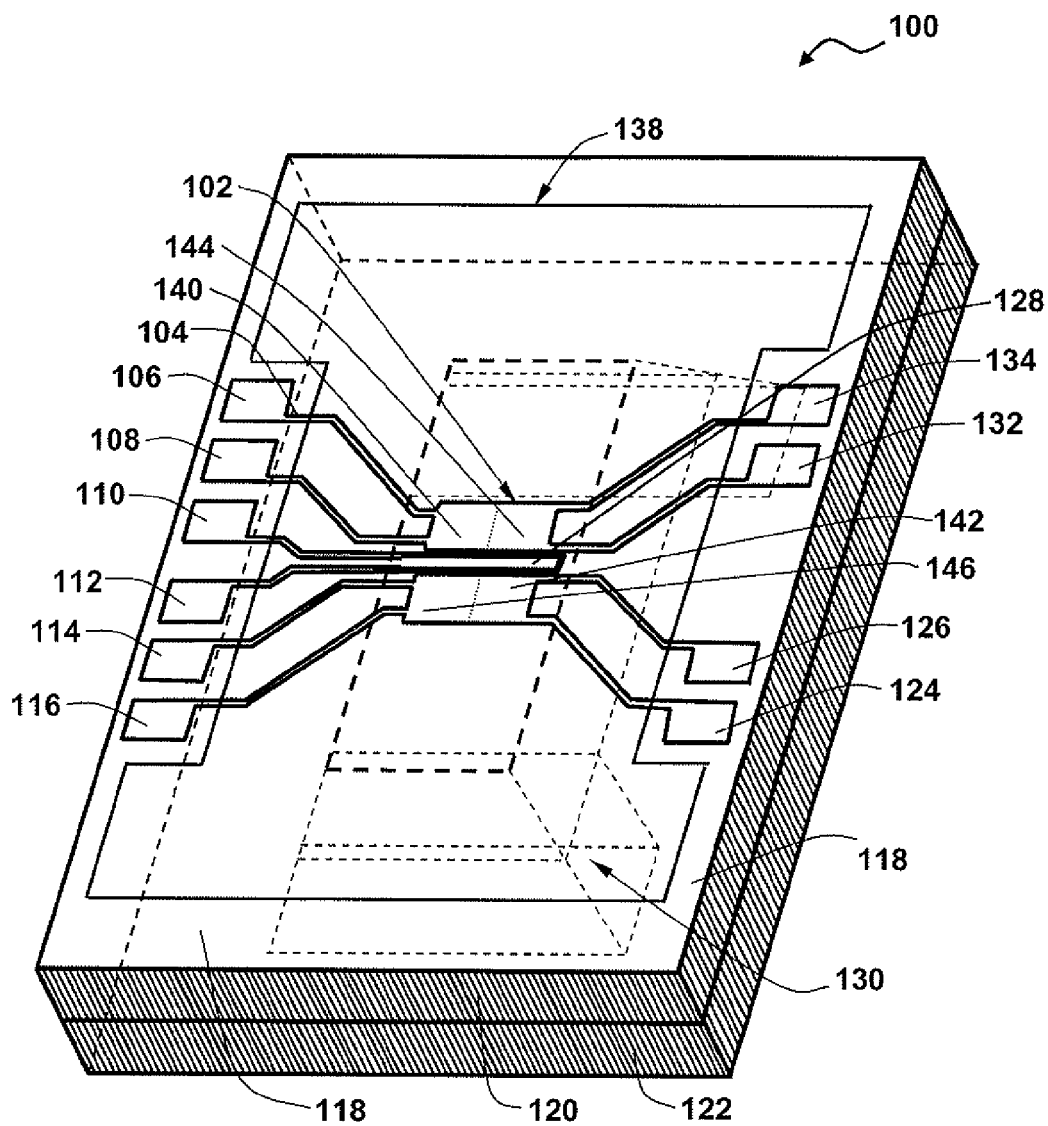
FIG. 1 illustrates a perspective view of a MEMS flow sensor, which can be adapted for use in implementing a preferred embodiment.

Referring to FIG. 1 a perspective view of MEMS flow sensor 100 is illustrated, in accordance with a preferred embodiment. The flow sensor 100 generally includes an isolation layer 138 formed of silicon nitride or other thermally and electrically insulating material on planar surface 118 of the upper structure 120. The upper structure 120 can be formed of silicon and is attached to a lower structure 122 which can be formed of any combination of silicon, glass and/or plastic. A sensing structure 102 is deposited on isolation layer 138. The upper structure 120 and lower structure 122 have tunneled features forming a flow channel 130 therein. The flow sensor 100 has a unique silicon chip based on advanced microstructure technology. The sensing structure 102 can be composed of a heating element 128 and sensing elements 140 and 142 formed on the isolation layer 138. The dual sensing elements 140 and 142 can be positioned on both sides of the central heating element 128 indicate flow direction as well as flow rate.

The heating element 128 and sensing elements 140 and 142 which comprises of temperature sensitive resistive thin films are preferably positioned in a full Wheatstone bridge configuration with the addition of sensing elements 144 and 146. The sensing structure 102 is deposited on or within the isolation plate 138 located over a precisely dimensioned flow channel 130 to provide a repeatable flow response. The isolation layer 138 can be deposited in layers so that sensing structure 102 may be encased within the layers to be protected from the media on the side of flow channel 130 and protected from the environment on the opposite side. The plate structure provides a sensitive and fast response to the flow of air or other fluid passing through the flow channel 130.

Electrical connection can be provided for connecting the ends of the thin film resistors sensing structure 102 to circuitry connection sites for associated sensor circuitry. The wire bond pads 106, 108, 110, 112, 114, 116, 124, 126, 132, and 134 can be used for electrical connection of the sensing structure 102. As an example, resistive thin film sensing element 144 may be electrically connected through the first electrical conductive lead 104 extending on or within the isolation layer 138 placed on the planar surface 118. Other electrical connections are made in the same manner. Thus, the fluid can be passed through the flow channel 130 hence wire bond pads 106, 108, 110, 112, 114, 116, 124, 126, 132, and 134 are isolated from the flow channel 130.

The electrical leads such as 104 including their associated electrical connections and wire bond pads preferably are formed by any of the well known metalization techniques currently in commercial use for the production of mass air flow sensors, integrated circuits and the like. Preferably the leads are either gold, preferably over a chromium adhesion layer, or aluminum. Alternative metals will be apparent to those skilled in the art in view of the present disclosure for particular applications in which the sensor can be used.

Figure 2:
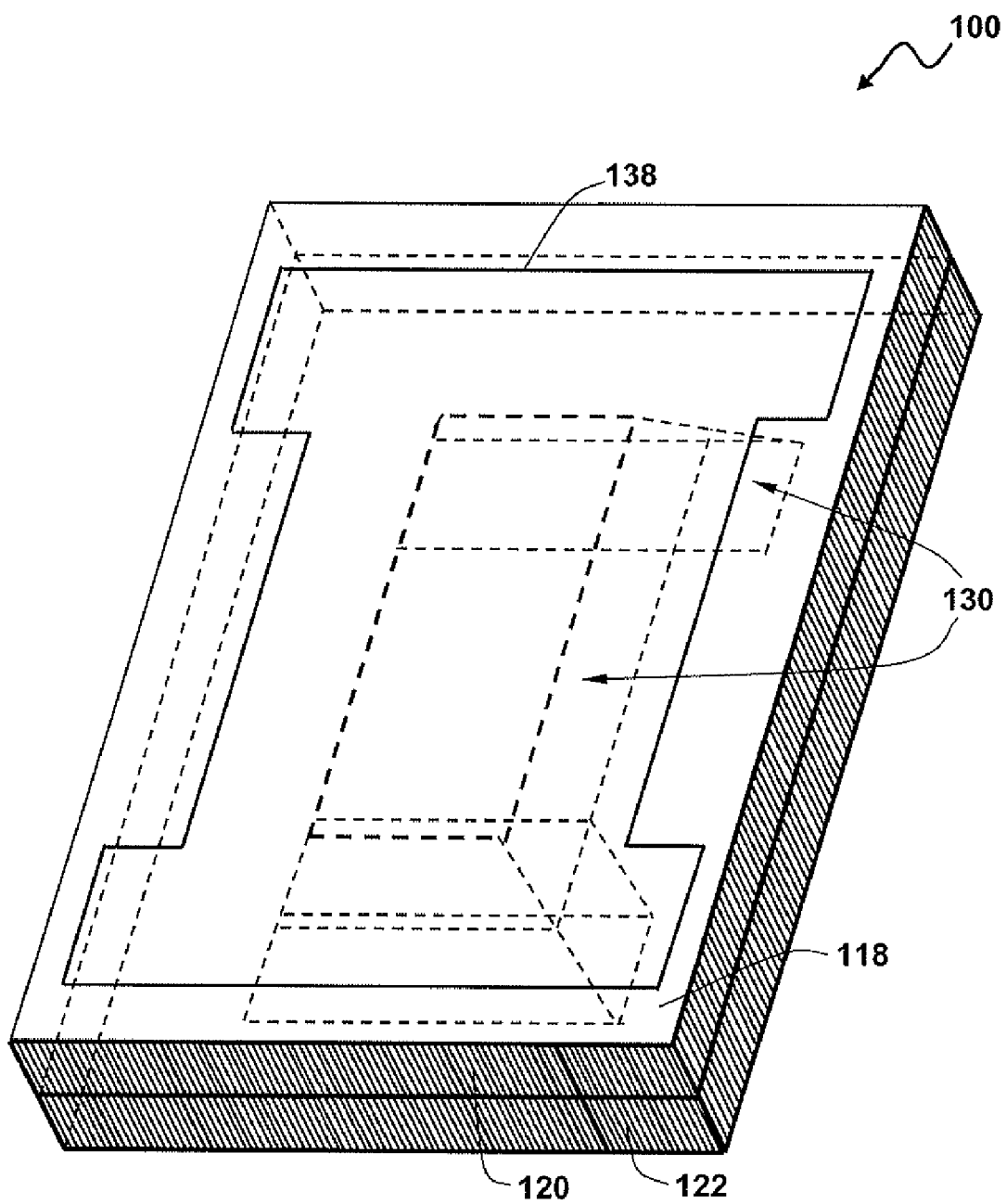
FIG. 2 illustrates a perspective view of MEMS flow sensor with a flow channel formed into a top and backing structure layers, in accordance with a preferred embodiment.

Referring to FIG. 2 a perspective view of MEMS flow sensor 100 better illustrating the flow channel 130 formed within the upper structure 120 and lower structure 122, backing surface, and the isolation layer 138, in accordance with a preferred embodiment. Note that in FIGS. 1-4, identical or similar blocks and elements are generally indicated by identical reference numerals. The lower structure 122 can be etched silicon, machined or molded glass or molded plastic with features such that when bonded to the upper structure 120 having an etched channel 130 and isolation layer 138, a thin isolation plate is formed for locating the sensing structure 102. The fluid can be directed through the flow channel 130 and avoid any contact with the wire bond pads 106-116, 132, 134, 124 and 126 as shown in FIG. 1.

Figure 3:
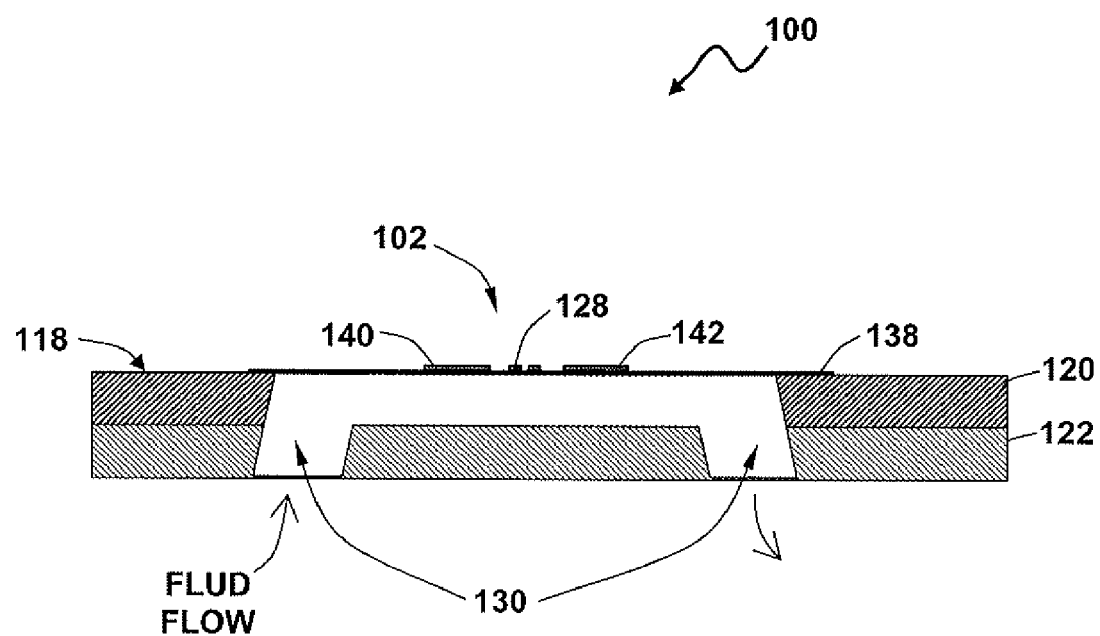
FIG. 3 illustrates a cross-sectional, side view of the MEMS flow sensor, in accordance with a preferred embodiment.

Referring to FIG. 3 a sectional view of the MEMS flow sensor 100 is illustrated, in accordance with a preferred embodiment. The flow sensor 100 operates on the theory of heat transfer. The resistive thin film 140, 142, and 128 can be deposited on upper surface of the isolation layer 138. Further layers of silicon nitride may be deposited over resistive thin films 140, 142, and 128 to encase on both sides for protection from media and the environment. The resistive film 140 and 142 can be formed in accordance with well-known metalization techniques of any material having suitable thin film resistance properties and suitable deposition characteristics. Preferably the resistive film 144 and 146 can be formed of platinum.

The flow sensor 100 has a unique silicon chip based on advanced microstructure technology. The heater 128 and the sensing elements 140 and 142 can be deposited on a thin-film, thermally isolated plate structure. The plate structure provides a sensitive and fast response to the flow of fluid through the flow channel 130. The dual sensing elements 140 and 142 positioned on both sides of a central heating element 128 indicate flow direction as well as flow rate. An output voltage varies in proportion to the fluid flow. The sensing elements 140 and 142 can be assembled utilizing standard wirebond pads and wirebonding methods. Also, a variety of materials and processes can be used to build the backing channel structure, which lends to a variety of options to optimize performance of the device.

Figure 4:
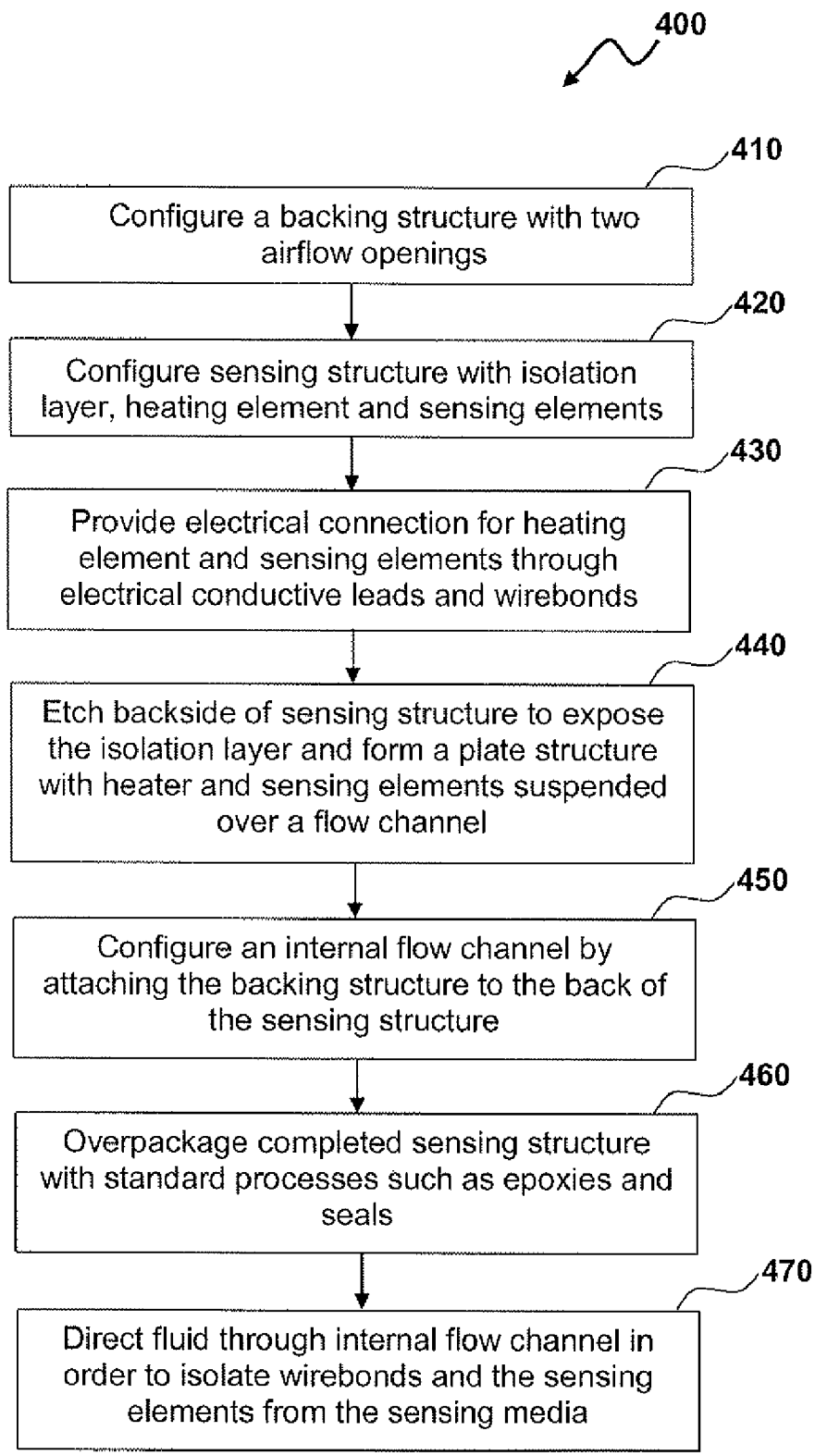
FIG. 4 illustrates a detailed flow chart of operations illustrating logical operational steps of a method for providing improved MEMS based flow sensor, in accordance with a preferred embodiment.

Referring to FIG. 4 a detailed flow chart of operations illustrating logical operational steps of a method for providing improved MEMS based flow sensor 400 is illustrated, in accordance with a preferred embodiment. Note that in FIGS. 1-4, identical or similar blocks and elements are generally indicated by identical reference numerals. As indicated at block 410, a backing structure 122 with two openings can be configured. Next, as depicted at block 420, the upper sensing structure 120 with isolation layer 138, heating element 128 and dual sensing element 140 and 142 can be configured. Thereafter, as illustrated at block 430, electrical connection for the heating element 128 and the sensing elements 140 and 142 can be provided through electrical conductive leads such as 104 and wirebond pads 106-116, 132, 134, 124 and 126 as shown in FIG. 1.

Block 440 describes the etching of the backside of the upper structure to expose the isolation layer and form a plate-like structure which contains the heater 128 and sensing elements 140 and 142. The structure is, in effect, suspended over the upper section of the flow channel.

The completed internal flow channel 130 can be configured by attaching the backing structure 138 to the back of the sensing structure 102, as described at block 450. The completed sensing structure 100 can be overpackaged with standard processes such as epoxies and seals, as shown at block 460. Finally as indicated at block 470, fluid can be directed through internal flow channel 130 in order to isolate wirebond pads such as 106 and 108 and the sensing elements 140 and 142 from the media. The heating element 128 transfers heat though the media and the plate structure. As media passes through the internal flow channel the difference in temperature of the sensing elements 140 and 142 will induce a resistance change that provides an output which can be correlated to mass flow. The resulting assembly can then be packaged as required.

The sensing structure 102 can be overpackaged utilizing standard processes such as epoxies and seals. Typically, the dual sensing element 140 and 142 and the heating element 128 are fabricated by depositing films of platinum by known metal deposition techniques, such as physical vapor deposition or sputtering. The electrically conductive leads 104, 136 and 148 are deposited using metal deposition techniques known in the art. The small size and thermal isolation of the microbridge flow sensor 100 are responsible for the extremely fast response and high sensitivity to flows. The flow sensor 100 can be more sensitive at very low flows and can potentially be utilized to sense ultra-low flow liquid. Similarly, the wirebonds and circuitry can be isolated from the flow stream, hence the microstructure is protected from damage.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A flow sensor, comprising:
   a backing structure including:
   a first major surface and an opposing second major surface spaced apart by a thickness of the backing structure;
   a first channel opening extending through the entire thickness of the backing structure from the first major surface to the second major surface;
   a second channel opening, laterally spaced from the first channel opening, and extending through the entire thickness of the backing structure from the first major surface to the second major surface;
   a sensing structure including:
   a substrate having a first major surface and an opposing second major surface spaced by a thickness of the substrate, the substrate having a cavity opening extending through the entire thickness of the substrate from the first major surface to the second major surface;
   a topside layer having a top side and a back side, the back side of the topside layer secured relative to the first major surface of the substrate, at least a portion of the topside layer suspended over the cavity opening in the substrate;
   a heater element and a plurality of sensing elements secured relative to the top side of said portion of said topside layer that is suspended over the cavity opening in the substrate, wherein a first one of said plurality of sensing elements is located adjacent said heating element in a first lateral direction and a second one of said plurality of sensing elements is located adjacent said heating element in a second lateral direction that is opposite to the first lateral direction;
   the first major surface of the backing structure is bonded to the second major surface of the substrate such that the first channel opening of the backing structure is in fluid communication with the cavity opening of the substrate and the spaced second channel opening of the backing structure is in fluid communication with the cavity opening of the substrate;
   wherein the first channel opening of the backing structure, the cavity opening in the substrate and the second channel opening of the backing structure form a fluid flow channel that directs fluid flow from adjacent the second major surface of the backing structure to the back side of the topside layer, and back to adjacent the second major surface of the backing structure.

2. The flow sensor of claim 1 further comprising;
   a plurality of electrical conductive leads extending along the top side of the topside layer from said heater element and said plurality of sensing elements to corresponding ones of a plurality of wirebond pads.

3. The flow sensor of claim 2, wherein said plurality of electrical conductive leads and said plurality of wirebond pads provide an electrical connection for said heater element and said plurality of sensing elements.

4. The flow sensor of claim 2 wherein said heater element and/or said plurality of sensing elements comprise a resistive thin film formed from a metal selected from nickel and platinum.

5. The flow sensor of claim 2 wherein said plurality of sensing elements are connected as part of a Wheatstone bridge.

6. The flow sensor of claim 1 wherein said sensing structure is overpackaged utilizing standard processes comprising epoxies and seals.

7. The sensor of claim 1 wherein said backing structure, said sensing structure and said resulting fluid flow channel are arranged together to comprise an assembly.

8. The flow sensor of claim 1 wherein said backing structure includes a material selected from the group comprising etched silicon, a fabricated glass, and a molded plastic.

9. A flow sensor, comprising:
   a backing structure having two spaced openings each extending entirely through the backing structure;
   a sensing structure including a substrate having an etched cavity extending entirely therethrough, and a topside layer having a top side and a back side, where the back side of the topside layer is secured relative to the substrate with at least a portion of the topside layer suspended over the etched cavity in the substrate, the sensing structure further having a heater element and a plurality of sensing elements disposed adjacent the top side of the topside layer, wherein two of said plurality of sensing elements are arranged on opposing lateral sides of said heating element;
   the sensing structure further having a plurality of electrical conductive leads extending above the top side of the topside layer and to said heater element and said plurality of sensing elements; and
   the backing structure is bonded to the sensing structure such that the two spaced openings in the backing structure are in fluid communication with the etched cavity in the substrate to provide a fluid flow path to the back side of the topside layer.

10. The flow sensor of claim 9, wherein said plurality of electrical conductive leads extend from said heater element and said plurality of sensing elements to corresponding ones of a plurality of wire bond pads.

11. The flow sensor of claim 9 wherein said heater element and/or said plurality of sensing elements comprises a resistive thin film formed from a metal selected from nickel and platinum.

12. The flow sensor of claim 9 wherein said plurality of sensing elements are connected as part of a Wheatstone bridge.

13. The flow sensor of claim 9 wherein said sensing structure is overpackaged utilizing standard processes comprising epoxies and seals.

14. The sensor of claim 9 wherein said backing structure, said sensing structure and said resulting fluid flow path are assembled together into an assembly.

15. The flow sensor of claim 9 wherein said backing structure includes a material selected from the group comprising etched silicon, a fabricated glass, and a molded plastic.

16. A MEMS flow sensor, comprising:
   a backing structure having two separate spaced apart openings for fluid flow formed there through;
   a sensing structure including a substrate having a backside cavity extending from a top side of the substrate to an opposing bottom side of the substrate, the sensing structure further having a topside layer secured relative to the top side of the substrate such that at least a portion of the topside layer is suspended over the backside cavity in the substrate thereby exposing a back side of the topside layer to the backside cavity, the sensing structure further having a heater element and at least one sensing element positioned over the top side of the topside layer,
   the backing structure is bonded to the sensing structure such that the two separate spaced apart openings in the backing structure are in fluid communication with the backside cavity in the substrate to provide a fluid flow path along the back side of the topside layer.

17. The flow sensor of claim 16 further comprising:
a plurality of electrical conductive leads extending from said heater element and said at least one sensing element to a plurality of wire bond pads.

18. The flow sensor of claim 17, wherein said plurality of electrical conductive leads and said plurality of wire bond pads provide an electrical connection for said heater element and said at least one sensing element.

19. The flow sensor of claim 16 wherein said at least one sensing element is connected as part of a Wheatstone bridge.

20. The flow sensor of claim 16 wherein said backing structure includes a material that is selected from a group comprising etched silicon, a fabricated glass, and a molded plastic.

* * * * *